United States Patent
Lofley, Jr.

(10) Patent No.: US 11,311,998 B1
(45) Date of Patent: Apr. 26, 2022

(54) EXTENSION TOOL

(71) Applicant: Robert G. Lofley, Jr., Ocala, FL (US)

(72) Inventor: Robert G. Lofley, Jr., Ocala, FL (US)

( * ) Notice: Subject to any disclaimer, the term of this patent is extended or adjusted under 35 U.S.C. 154(b) by 191 days.

(21) Appl. No.: 16/536,955

(22) Filed: Aug. 9, 2019

Related U.S. Application Data

(60) Provisional application No. 62/717,539, filed on Aug. 10, 2018.

(51) Int. Cl.
 *B25G 1/04* (2006.01)
 *B25F 1/00* (2006.01)
 *B61H 13/02* (2006.01)

(52) U.S. Cl.
 CPC ............... *B25G 1/04* (2013.01); *B25F 1/00* (2013.01); *B61H 13/02* (2013.01)

(58) Field of Classification Search
 CPC ... B25G 1/00; B25G 1/04; B25G 1/10; B25G 1/043; B25G 1/005; B25F 1/00; B61H 13/02; B25J 1/00; B25B 23/0021; B25B 23/0035; B25B 13/48; B25B 13/481; F16B 7/14; F16B 7/1418; F16B 7/1472; F16B 7/105
 See application file for complete search history.

(56) References Cited

U.S. PATENT DOCUMENTS

| | | | |
|---|---|---|---|
| 685,858 A | 10/1901 | Pearson | |
| 872,271 A | 10/1907 | Benet | |
| 918,579 A | 4/1909 | Murch | |
| 1,365,851 A | 1/1921 | Reynolds | |
| 1,726,372 A | 8/1929 | Stoll | |
| 4,076,213 A | 2/1978 | Payson | |
| 4,577,837 A | 3/1986 | Berg et al. | |
| 4,586,399 A * | 5/1986 | Kassai | B62B 7/08 |
| | | | 74/551.3 |
| 4,646,378 A | 3/1987 | Borden | |
| 4,715,252 A | 12/1987 | Pella | |
| 4,918,896 A | 4/1990 | Wiese | |
| 4,991,469 A | 2/1991 | Pella | |
| 5,433,551 A | 7/1995 | Gordon | |
| 5,481,950 A | 1/1996 | Browning | |
| 5,625,923 A | 5/1997 | Huang | |
| 5,811,688 A | 9/1998 | Marsh et al. | |
| 6,182,539 B1 | 2/2001 | Webster | |

(Continued)

OTHER PUBLICATIONS www.alltackle.com/rupp_big_riggs_ruppriggers.htm.

(Continued)

*Primary Examiner* — Robert J Scruggs
(74) *Attorney, Agent, or Firm* — Frijouf, Rust & Pyle, P.A.

(57) ABSTRACT

An extension tool extends a device. The extension tool includes a first pole slidably receiving a second pole. A collar is secured to the first pole having a pin aperture. A platform is pivotably coupled to the collar. A pin is coupled to the platform. A retainer is coupled to the collar and engages with the platform for maintaining the platform in the closed position and disengaging with the platform for positioning the platform in the open position. The closed position positions the pin in one of the plurality of apertures for fixing the position of the second pole relative to the first pole. The open position disengages the pin from one of the plurality of apertures of the second pole for permitting displacement of the second pole relative to the first pole.

15 Claims, 10 Drawing Sheets

(56) References Cited

U.S. PATENT DOCUMENTS

| | | |
|---|---|---|
| 6,213,672 B1 | 4/2001 | Varga |
| 6,254,305 B1 | 7/2001 | Taylor |
| 6,347,777 B1 | 2/2002 | Webber |
| 6,461,074 B2 | 10/2002 | Taylor |
| 6,682,209 B2 | 1/2004 | Drake et al. |
| 6,951,185 B1 | 10/2005 | Wiese |
| 7,025,015 B2 | 4/2006 | Wilcox et al. |
| 7,040,832 B2 * | 5/2006 | Hsieh .................. F16B 7/105 248/125.8 |
| 7,097,380 B2 | 8/2006 | Lee |
| 7,111,574 B2 | 9/2006 | Slatter |
| 7,293,934 B1 * | 11/2007 | Huang .................. F16B 7/105 403/109.1 |
| 7,311,061 B1 | 12/2007 | Wiese |
| D663,193 S | 7/2012 | Lofley, Sr. et al. |
| D676,735 S | 2/2013 | Lofley, Sr. et al. |
| 8,434,802 B2 | 5/2013 | Lofley, Sr. et al. |
| 8,469,425 B1 * | 6/2013 | Lofley, Sr ............ B25G 1/04 294/210 |
| 8,469,426 B2 | 6/2013 | Lofley, Sr. et al. |
| 8,939,051 B1 | 1/2015 | Lofley, Sr. et al. |
| D760,564 S | 7/2016 | Lofley, Sr. et al. |
| D786,638 S | 5/2017 | Lofley, Sr. et al. |
| D843,183 S | 3/2019 | Lofley, Sr. et al. |
| 10,759,453 B1 * | 9/2020 | Ayala ...................... B63B 21/54 |
| 2003/0156923 A1 * | 8/2003 | Winkler ................. F16B 21/04 411/552 |
| 2004/0016385 A1 | 1/2004 | Wilcox et al. |
| 2006/0062632 A1 * | 3/2006 | Jang ...................... E04H 15/46 403/109.6 |

OTHER PUBLICATIONS www.paint-and-supplies.hardwarestore.com/47-345-extention-poles/z-pro-telescoping-extension-pole-453423.aspx.
U.S. Appl. No. 13/616,293, Robert G. Lofley, Sr., et al.
U.S. Appl. No. 13/757,482, Robert G. Lofley, Sr., et al.
U.S. Appl. No. 13/834,674, Robert G. Lofley, Sr., et al.
U.S. Appl. No. 13/837,198, Robert G. Lofley, Sr., et al.
U.S. Appl. No. 12/567,135, Ricardo Cuyar.
U.S. Appl. No. 13/926,127, Robert G. Lofley, Sr., et al.
U.S. Appl. No. 13/926,168, Robert G. Lofley, Sr., et al.
U.S. Appl. No. 14/206,040, Robert G. Lofley, Sr., et al.
U.S. Appl. No. 14/206,659, Robert G. Lofley, Sr., et al.
U.S. Appl. No. 14/278,806, Robert G. Lofley, Sr., et al.
U.S. Appl. No. 14/605,442, Robert G. Lofley, Sr., et al.
U.S. Appl. No. 15/631,338, Ayala.

* cited by examiner

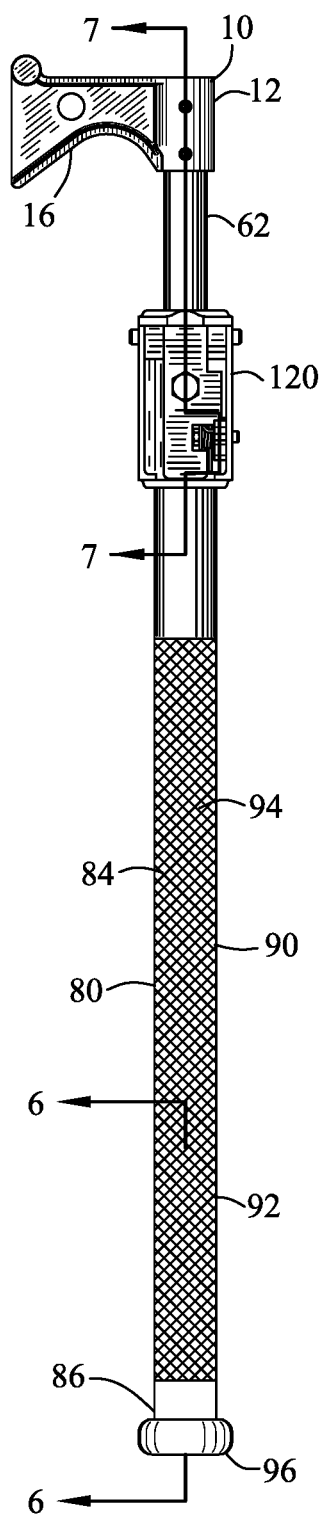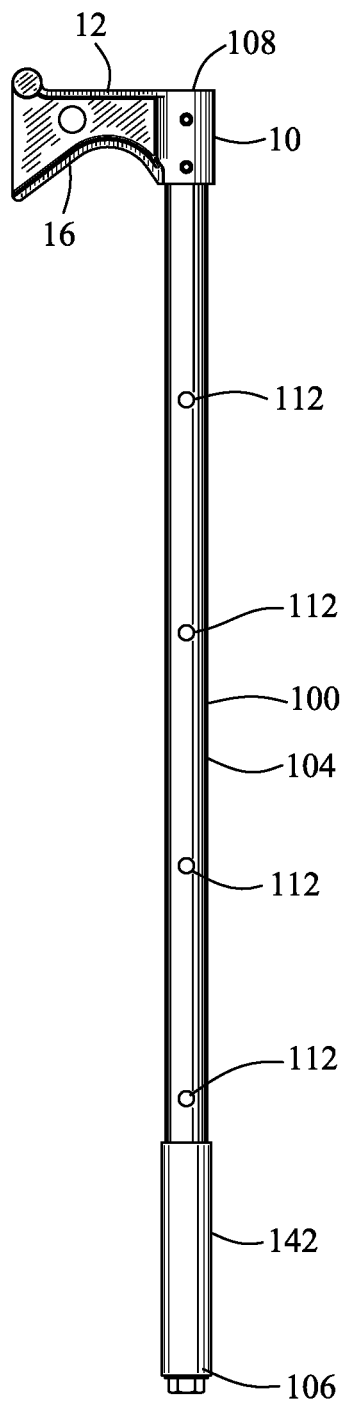
FIG. 1  FIG. 2  FIG. 3

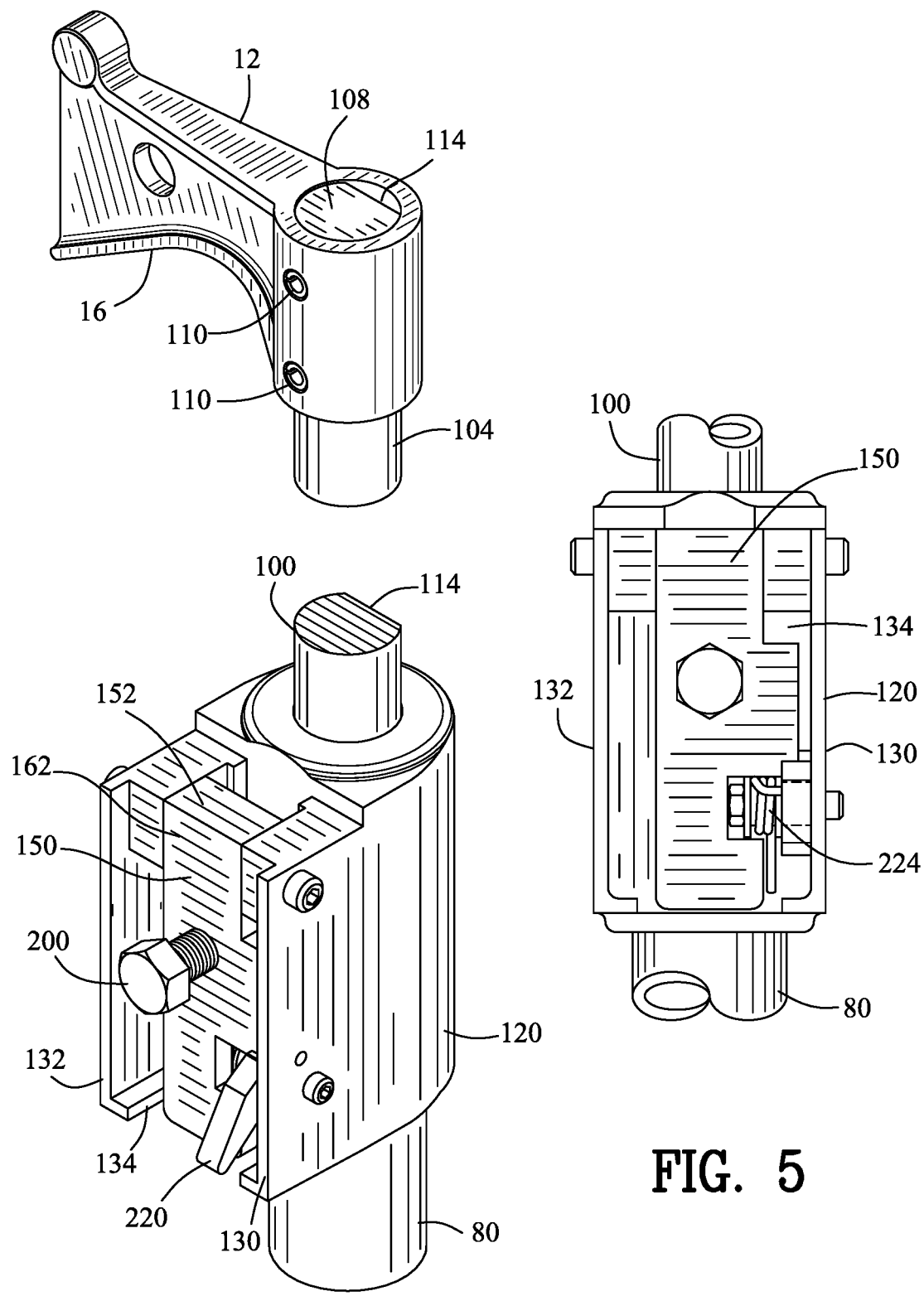

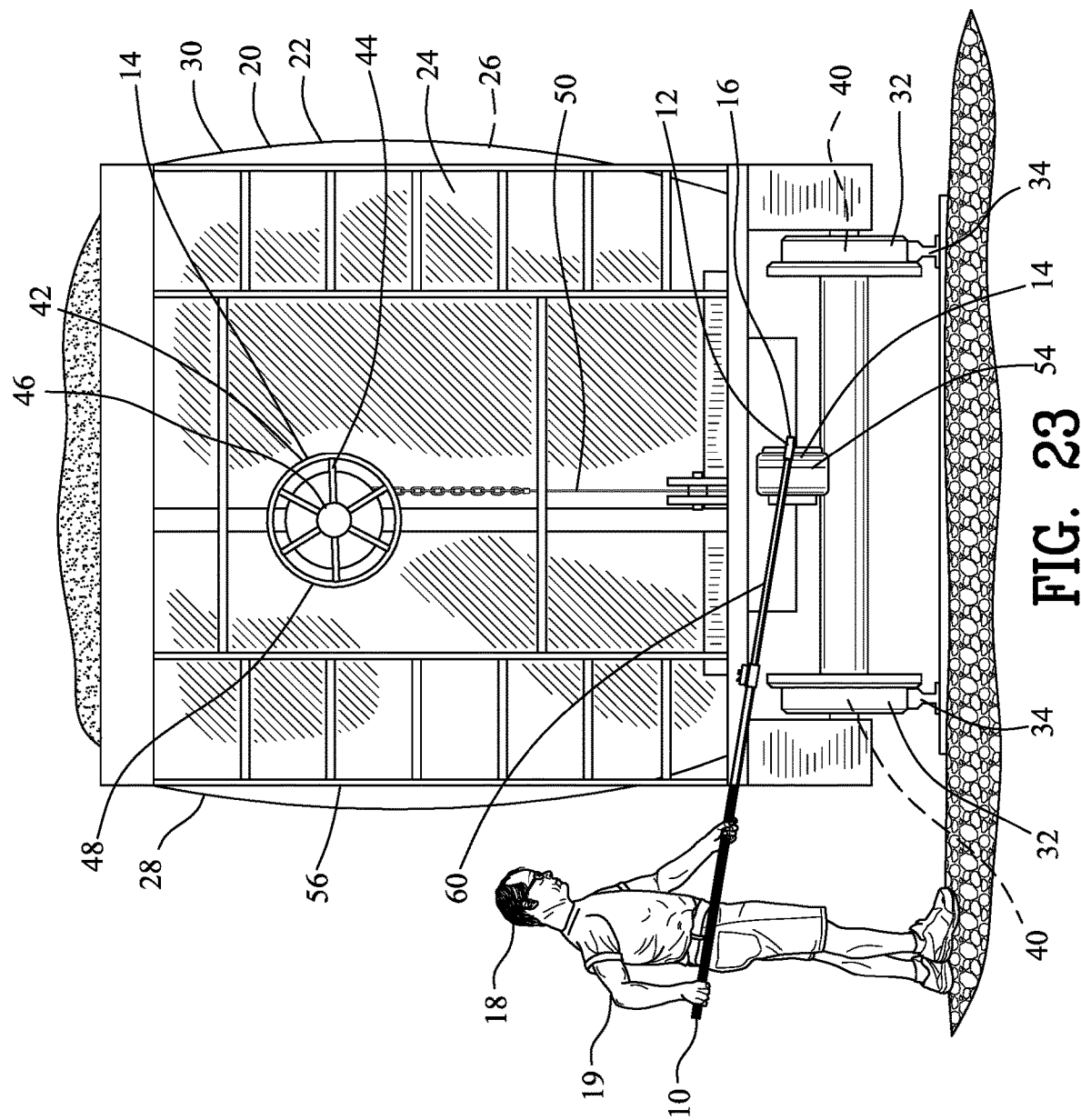

EXTENSION TOOL

CROSS-REFERENCE TO RELATED APPLICATIONS

This application claims benefit of U.S. Patent Provisional application Ser. No. 62/717,539 filed Aug. 10, 2018. All subject matter set forth in provisional application Ser. No. 62/717,539 is hereby incorporated by reference into the present application as if fully set forth herein.

BACKGROUND OF THE INVENTION

Field of the Invention

This invention relates to tools and more particularly to an extension tool.

Background of the Invention

Various types of tools have been devised in the past for moving, rotating, positioning, supporting or contacting an object. One particular application of these tools is a paint stick wherein a paint dispensing device is secured to the end of the tool. The length of the paint stick may be altered by telescoping a first pole relative to a second pole.

Another application of these tools is an outrigger wherein a line may be supported from a first location on a vessel to a second location distant from a vessel. The length of the outrigger may be altered by telescoping a first pole relative to a second pole.

Another application of these tools is a railroad tool wherein a claw is located on an end of the tool for rotating a break actuator on a railroad car. Typically, the railroad car wheel break is actuated by rotating the break actuator. The break actuator may include a wheel having a plurality of spokes extending from a central hub. The rotation of the wheel rotates the hub and a shaft attached thereto for manually engaging a brake shoe to a surface of the railroad car wheel. The engagement of the brake shoe against the railroad car wheel prevents undesired movement of the railroad train car.

In most cases, the break actuator is located on the upper end of the railroad car. This necessitated the railroad employee to climb a ladder between typically two adjacent railroad cars to rotate the wheel on each of the railroad cars. Thereafter, the employee must descend the latter to move to the next railroad car and climb the ladder and rotate the wheel in a similar pattern.

This procedure is very time consuming and possibly dangerous activity since the railroad employee is required to climb the ladders on each of the railroad cars that are in many cases located between two adjacent railroad cars. The following U.S. Patents are examples of attempts of the prior art to solve these problems.

U.S. Pat. No. 684,858 to Pearson discloses a wire fence tool comprising a handle, a hatchet-blade thereon having a disk-shaped facial recess in one side. A wire-cutter is seated in the recess and forms a flush portion of the hatchet-blade. An opening lever-handle is connected with the cutter-disk and a retaining loop for the lever-handle. The hatchet-blade and cutter-disk are provided with registering wire-receiving notches.

U.S. Pat. No. 872,271 to Benet discloses a device combining a pair of members connected pivotally together and provided with claws for the purpose of gripping a nail or the like. One of the members is provided with a longitudinal portion for increasing the leverage between the claws. The longitudinal portion terminates at one of its ends in a screw driver blade having a sharp portion and also having shoulders disposed upon opposite sides of the sharp portion. A handle is mounted telescopically upon the longitudinal portion of the blade and is provided with a pair of oppositely disposed impact surfaces for engaging the shoulders and receiving therefrom the force of impact so as to avoid injury to the sharp portion of the screw driver blade.

U.S. Pat. No. 4,646,378 to Borden discloses a combination tool comprising a first and a second tool members with hinge structure pivotally securing the first and the second members together so that they may be selectively pivoted between opened and closed positions of use wherein. The first tool member includes a pair of spaced-apart generally parallel extending side walls forming a sheath portion between which the second tool member may be folded or enclosed in closed position thereof. The first tool member also includes a first tool portion and a first bridge portion at one end thereof and a second bridge portion adjacent the other end thereof but intermediate these ends. The first and second bridge extend between and integrally connecting sidewalls. The second tool member includes a second and third tool portions at opposite ends thereof and an intermediate region adjacent the second tool portion with this intermediate region being disposed between the side walls and hingedly assembled adjacent the other end of the first tool member, wherein in the folded or closed position of the combination tool, the second tool member is disposed between the side walls and resting on the bridge portions and the second and third tool portions extend beyond the opposite ends of the first tool member and the first tool portion is disposed in exposed condition so that all three tool portions are available for use in both the opened and folded or closed conditions of the tool members.

U.S. Pat. No. 4,715,252 to Pella discloses a device for safely rotating the wheel of a large or hard-to-turn valve. The wrench comprises an elongated handle, and a wheel grip. The wheel grip further consists of a rim grip and a spoke grip. The rim grip extends upwardly (when viewed from above) around the bottom of the rim of a valve wheel. The spoke grip extends downwardly, first around the rim of the wheel, then inwardly, so as to grasp the spoke of the valve wheel.

U.S. Pat. No. 4,991,469 to Pella discloses a device for safely rotating the handwheel of hard-to-turn valves has an elongate handle terminating in a fixed wheel-rim-engaging jaw. A movable wheel-engaging jaw is pivotally attached to the handle behind the fixed jaw. When the movable jaw is applied to the inner surface of the handwheel rim and the fixed jaw is applied to the outer surface of the rim, turning force on the handle forces the two jaws together by a leveraged force to enhance gripping of the rim while turning the wheel. Protuberances on the movable jaw enhance gripping the wheel rim and spoke.

U.S. Pat. No. 5,481,950 to Browning discloses a rigid head extending laterally from an adjustable handle has an elongate slot therethrough aligned with the longitudinal axis, of the handle for receiving and operating the handle of a valve. A first concave surface is formed in the upper edge of the head for pushing on the spokes of a brake wheel. The first concave surface has opposite ends of similar slope approaching ninety degrees relative to the upper edge for pushing on the spokes of a brake wheel and preventing kick-out of the tool from the brake wheel. A second concave surface is formed in the lower edge of the head for pulling on the spokes of a brake wheel. A first end of the second concave surface has a slope approaching ninety degrees relative to the lower edge of the head that is significantly less than the slope of the first end to facilitate kick-out of the tool while the brake wheel is in motion. The second concave surface slopes to a point where it joins the outer edge of the head to define a point adapted to fit within a hole in a knuckle of a railroad car.

U.S. Pat. No. 6,182,539 to Webster discloses a telescoping handle assembly including an inner and outer telescoping handle sections. The inner section has an outer surface and a series of grooves at predetermined locations spaced along the length of the inner section. The outer section includes locking teeth that are fixed axially in position along the length of the outer section and that are resiliently movable between a locked condition disposed in one of the grooves on the inner section and an unlocked condition. The handle assembly includes a locking sleeve movable in a first direction to apply radially inwardly directed force to the locking teeth to maintain the locking teeth in the locked condition and thereby to block telescopic movement of the inner section relative to the outer section. The locking sleeve is movable in a second direction opposite the first direction to enable movement of the locking teeth out of the locking condition thereby to enable telescopic movement of the inner section relative to the outer section.

Although the aforementioned prior art have contributed to the development of the art of tools, none of these prior art patents have solved the needs of the art.

Therefore, is an object of this invention to provide an improved tool for moving, rotating or contacting an object.

Another object of this invention is to provide an improved tool for mounting a tool device thereon.

Another object of this invention is to provide an improved tool for mounting a sensor device thereon.

Another object of this invention is to provide an improved tool for mounting a support device thereon.

Another object of this invention is to provide an improved tool for rotating the break actuator of a railroad car for actuating a wheel break.

Another object of this invention is to provide an improved tool for pivoting a knuckle coupler of a railroad car.

Another object of this invention is to provide an improved tool that is light-weight and easy to carry.

Another object of this invention is to provide an improved tool that can be extended and retracted for varying the length of the tool.

Another object of this invention is to provide an improved tool that may be extended and retracted with a minimum resistance force.

Another object of this invention is to provide an improved tool that may be extended and retracted without jamming.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved extension tool for extending a device. The extension tool comprises a first pole defining an interior bore and a first exterior surface with the first pole extending between a first end and a second end. A handle is defined in proximity to the first end of the first pole. A second pole defines a second exterior surface with the second pole extending between a first end and a second end. A couple attaches the device with the second pole. The second pole is partially disposed in the first pole with the internal bore of the first pole slidably engaging with the exterior surface of the second pole for enabling the second pole to be slidably displaced relative to the first pole. A plurality of apertures are defined in the second pole. A collar is secured to the second end of the first pole. The collar has a pin aperture. A platform is pivotably coupled to the collar for pivoting the platform relative to the collar between a closed position and an open position. A pin is coupled to the platform. A retainer is coupled to the collar and engages with the platform for maintaining the platform in the closed position and disengaging with the platform for positioning the platform in the open position. The closed position positions the pin in a protruded position and the open position positions the pin in a retracted position. The protruded position engages the pin into one of the plurality of apertures of the second pole for fixing the position of the second pole relative to the first pole. The retracted position disengages the pin from one of the plurality of apertures of the second pole for permitting displacement of the second pole relative to the first pole.

In a more specific embodiment of the invention, the platform extends between a proximal end and a distal end. A platform pivot engages the collar and the platform. The platform pivot is adjacent to the proximal end of the platform for defining a platform fulcrum portion. A platform effort arm is adjacent to the distal end of the platform for defining a platform effort portion. A platform notch is between the platform pivot and the platform effort arm for permitting the retainer to traverse the platform. The platform notch engages the retainer during positioning the platform into the closed position for defining a platform resistance portion. The platform fulcrum portion, the platform effort portion and the platform resistance portion define a platform lever for obtaining a platform leverage during positioning the platform from the open position to the closed position.

In another embodiment of the invention, a platform spring is positioned between the collar and the platform for providing a platform expanding force and displacing the platform from the closed position to the open position upon the retainer disengaging from the platform. The platform lever provides the platform leverage for compressing the platform spring during positioning the platform from the open position to the closed position.

In a more specific embodiment of the invention, the retainer extends between a proximal end and a distal end. A retainer pivot engages the collar and the retainer. The retainer pivot is adjacent to the proximal end of the retainer for defining a retainer fulcrum portion. A retainer effort arm is adjacent to the distal end of the retainer for defining a retainer effort portion. A retainer lock surface is between the retainer pivot and the retainer effort arm. The retainer lock surface engages the platform with the platform in the closed position for defining a retainer resistance portion. The retainer fulcrum portion, the retainer effort portion and the retainer resistance portion define a retainer lever for obtaining a retainer leverage for overcoming the retainer spring and pivoting the retainer and disengaging the retainer from the platform.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a side view of an extension tool of the present invention;

FIG. 2 is a side view of a first pole of FIG. 1;

FIG. 3 is a side view of a second pole of FIG. 1;

FIG. 4 is an enlarged partial isometric view of FIG. 1 illustrating a collar and a tool head;

FIG. 5 is a top view of the collar in FIG. 4;

FIG. 23 is a view similar to FIG. 22 illustrating the extension tool engaging a knuckle coupler of a railroad car.

Similar reference characters refer to similar parts throughout the several Figures of the drawings.

DETAILED DISCUSSION

Figure 6:
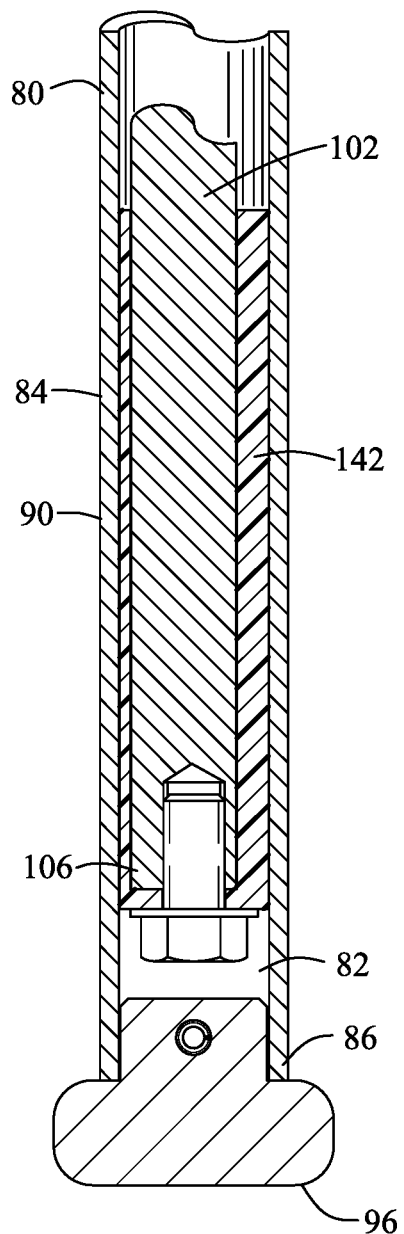
FIG. 6 is a sectional view along line 6-6 in FIG. 1.
Figure 7:
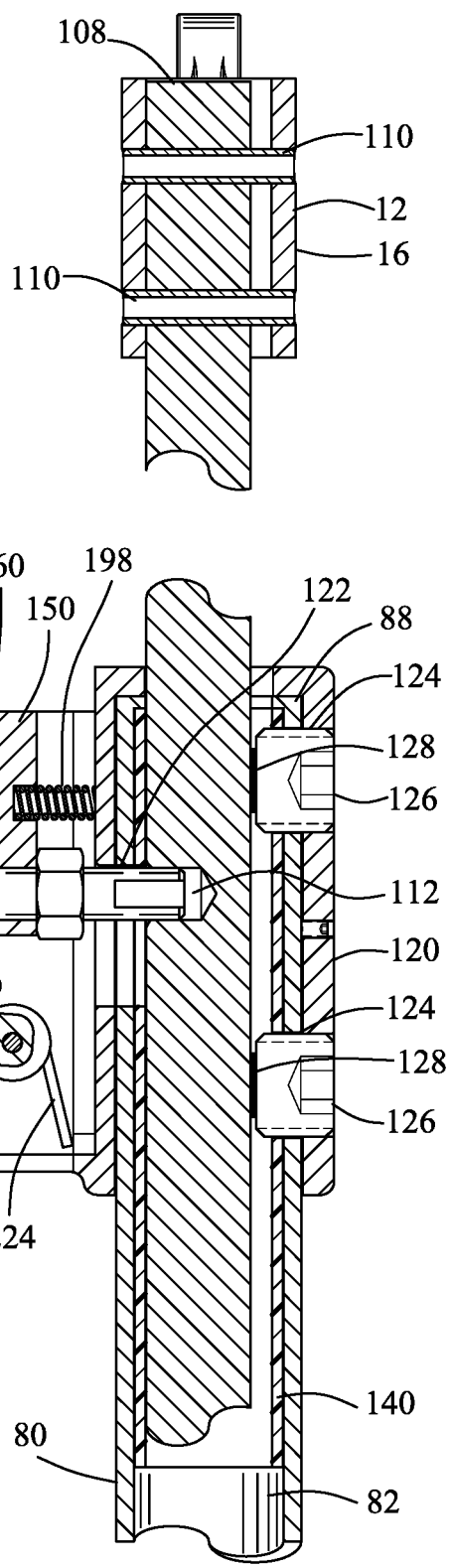
FIG. 7 is a sectional view along line 7-7 in FIG. 1.

FIGS. 1-23 are various views of an extension tool 10 for extending a device 12. The device 12 may be used for moving, rotating, positioning, supporting or contacting an object 14. As shown in FIGS. 22 and 23, the device 12 may include a claw 16. Alternatively, the device 12 may include tools, supports, electrically devices or other hardware.

The claw 16 may be utilized for engaging a railroad car 20. As shown in FIGS. 22 and 23, the railroad car 20 includes a container 22 having a front side 24, a rear side 26, a left side 28 and a right side 30. The railroad car 20 further includes a plurality of wheels 32 for rotatably engaging along a rail system 34. The plurality of wheels 32 support the container 22 and permitting the container 22 to be displaced to multiple locations. A brake 40 engages the plurality of wheels 32 for terminating rotation of the plurality of wheels 32. A wheel brake 42 is rotatably coupled to the railroad car 20. The wheel brake 42 has a plurality of spokes 44 extending between a central hub 46 and a circular rail 48. A brake linkage 50 couples the wheel brake 42 with the brake 40 such that upon rotation of the wheel brake 42 the brake 40 either compresses or expands relative to the plurality of wheels 32.

The front side 24 and/or the rear side 26 of the railroad car 20 include a knuckle coupler 52 for linking with a second railroad car 20. The knuckle coupler 52 has a generally J-shape hook 54 for linking with other generally J-shape hooks 54. The knuckle coupler 52 pivotably engage the railroad car 20 for permitting the generally J-shape hook 54 to be displaced during engagement with another generally J-shape hook 54.

In the past an operator 18 was required to ascend a railroad car latter 56 in order to rotate the wheel brake 42. Furthermore, prior to the coupling of the knuckle couplers 52 the operator 18 may be required to apply a horizontal force to the knuckle coupler 52 for pivoting the generally J-shape hooks 54. In the past the operator 18 may have utilized their limbs 19 for pivoting the generally J-shape hooks 54. Having the operator 18 ascending the railroad car latter 56 and positioned in close proximity to the knuckle coupler 52 could prove highly dangerous by causing great bodily harm or death.

FIGS. 1-23 illustrate the tool 10 that may eliminate the need for the operator 18 to ascend the ladder 56 to rotate the wheel brake 42. The tool 10 may be positioned between an extended length 60 as shown in FIGS. 22 and 23 and a retracted length 62 as shown in FIG. 1 for varying the overall length of the tool 10.

The tool 10 comprises a first pole 80. The first pole 80 has a first internal bore 82, a first exterior surface 84 and extends between a first end 86 and a second end 88. A second pole 100 defines a second internal bore 102, a second exterior surface 104 and extends between a first end 106 and a second end 108. The device 12 is secured to the second end 108 of the second pole 100 by a couple 110. The couple 110 may include one or more set pins, adhesive, bolts or other fasteners.

The first end 106 of the second pole 100 engages the second end 58 of the first pole 50 for positioning the second pole 100 into the internal bore 52 of the first pole 50. More specifically, the second pole 100 is partially disposed in the first pole 80 with the internal bore 82 of the first pole 80 slidably engaging with the exterior surface 104 of the second pole 100 for enabling the second pole 100 to be slidably displaced relative to the first pole 80.

A handle 90 is defined in proximity to the first end 86 of the first pole 80 for the operator 18 to engage with the extension tool 10. The exterior surface 84 of the first pole 80 may have a textured surface 92 or a knurled portion 94 for assisting in handling the tool 10. The second pole 100 has a plurality of apertures 112 extending between the second exterior surface 104 to the second internal bore 102.

A collar 120 is secured to the second end 88 of the first pole 80. The collar 120 has a pin aperture 122. The collar 120 may further include one or more set apertures 124 for receiving a collar setscrew 126. Preferably, the second pole 100 has an elongated flat portion 114 extending between the first end 106 and the second end 108. The collar setscrew 126 function to secure the collar 122 the first pole 80. Furthermore, the collar setscrew 126 are positioned adjacent to the elongated flat portion 114 for preventing rotation of the second pole 100 relative to the first pole 80.

Figure 18:
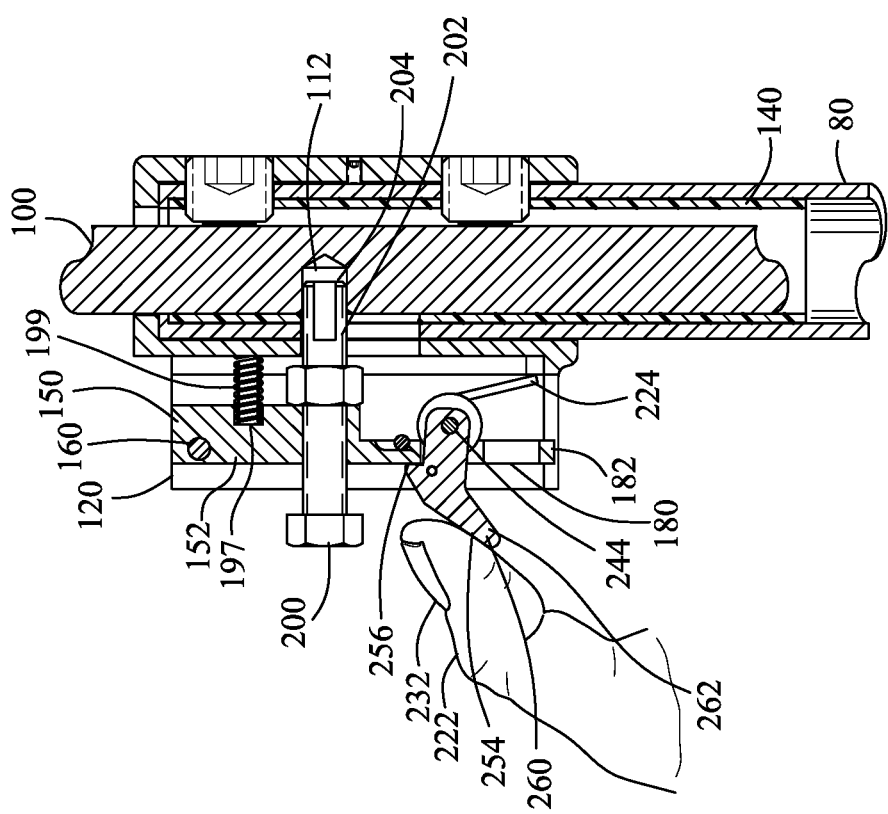
FIG. 18 is a view similar to FIG. 17 illustrating the retainer being displaced for disengaging from the platform and the finger applying an ascending force for removing the pin from the second pole.

A platform 150 is pivotably coupled to the collar 120 for pivoting the platform 150 relative to the collar 120 between a closed position 152 as shown in FIGS. 1, 2, 4, 7, 8, 15-17 and 21 and an open position 154 as shown in FIG. 18. The platform 150 extends between a proximal end 156 and a distal end 158. A platform pivot 160 or pivot pin engages the collar 120 and the platform 150 for pivoting the platform 150 relative to the collar 120.

A pin 200 is coupled to the platform 150. The pin 200 may include a threaded bolt that threadably engages a threaded aperture in the platform 150. Alternatively, the pin 200 may include a non-threaded rod coupled to the platform 150. The pin 200 traverses the pin aperture 122 and is positioned within one of the plurality of apertures 112 for terminating displacement of the second pole 100 relative to the first pole 80. The pin 200 is removed from one of the plurality of apertures 112 for permitting for displacement of the second pole 100 relative to the first pole 80.

A pin depth adjustment device 202 may engage the pin 200 for adjusting the depth of engagement of the pin 200 with the plurality of apertures 112 in the second pole 100. The pin depth adjustment device 202 may include the threaded bolt threadably engaging with the threaded aperture in the platform 150. A locking nut may threadably engage with the pin 200 and compress up against the platform 150 for preventing any further rotation of the pin 200.

A retainer 220 is coupled to the collar 120 and engages with the platform 150 for maintaining the platform 150 in the closed position 152 and disengaging with the platform 150 for positioning the platform 150 in the open position 154. The closed position as shown in FIGS. 1, 2, 4, 7, 8, 15-17 and 21 positions the pin 200 in a protruded position 174. The open position 154 as shown in FIG. 18 positions the pin 200 in a retracted position 176. The protruded position 174 engages the pin 200 into one of the plurality of apertures 112 of the second pole 100 for fixing the position of the second pole 100 relative to the first pole 80. The retracted position 176 disengages the pin 200 from one of the plurality of apertures 112 of the second pole 100 for permitting displacement of the second pole 100 relative to the first pole 80.

The collar 120 may include a first wall 130 and a second wall 132 for defining a wall channel 134 there between. The platform 150 may be pivotably coupled to the first wall 130 and the second wall 132 for positioning the platform 150 within the wall channel 134 in the closed position 152 and exterior to the wall channel 134 in the open position 154. The platform 150 defines a channel cover 162 over the wall channel 134 with the platform 150 in the closed position 152.

The platform pivot 160 is preferably adjacent to the proximal end 156 of the platform 150 for defining a platform fulcrum portion 170. A platform effort arm 172 is adjacent to the distal end 158 of the platform 150 for defining a platform effort portion 174. A platform notch 176 is between the platform pivot 160 and the platform effort arm 172 for permitting the retainer 180 to traverse the platform 150.

Figure 19:
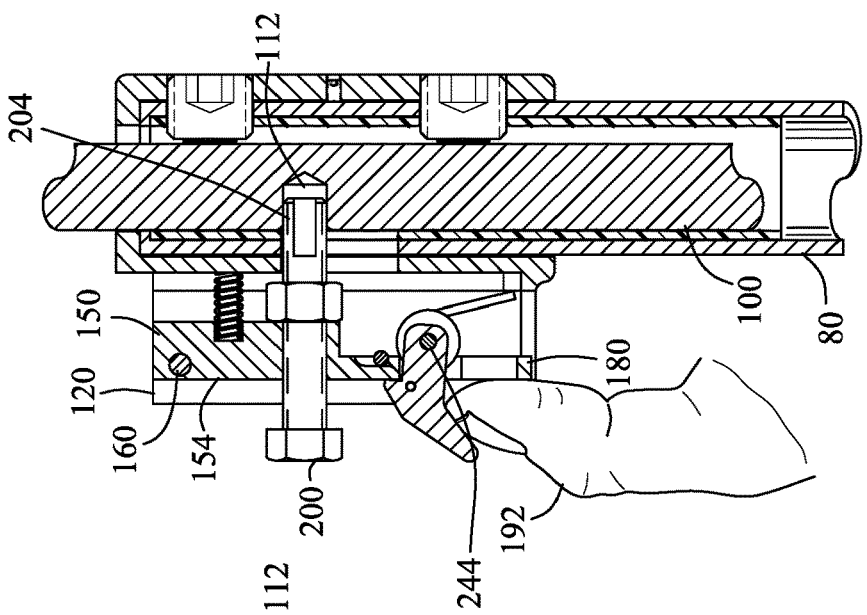
FIG. 19 is a view similar to FIG. 18 illustrating the finger applying a descending force for pivoting the retainer upon contact with the platform and positioning the pin with the second pole.
Figure 20:
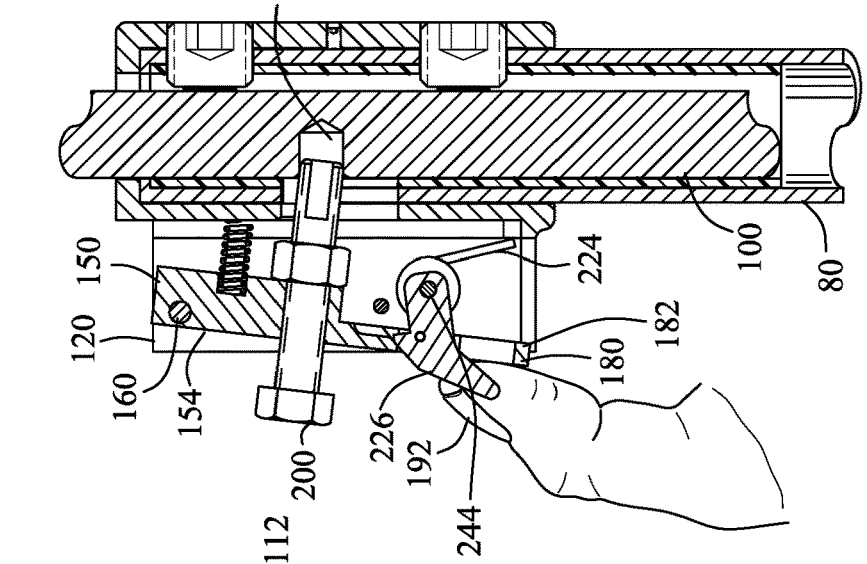
FIG. 20 is a view similar to FIG. 19 illustrating the finger continuing to apply a descending force for further pivoting the retainer upon contact with the platform and further positioning the pin with the second pole.
Figure 21:
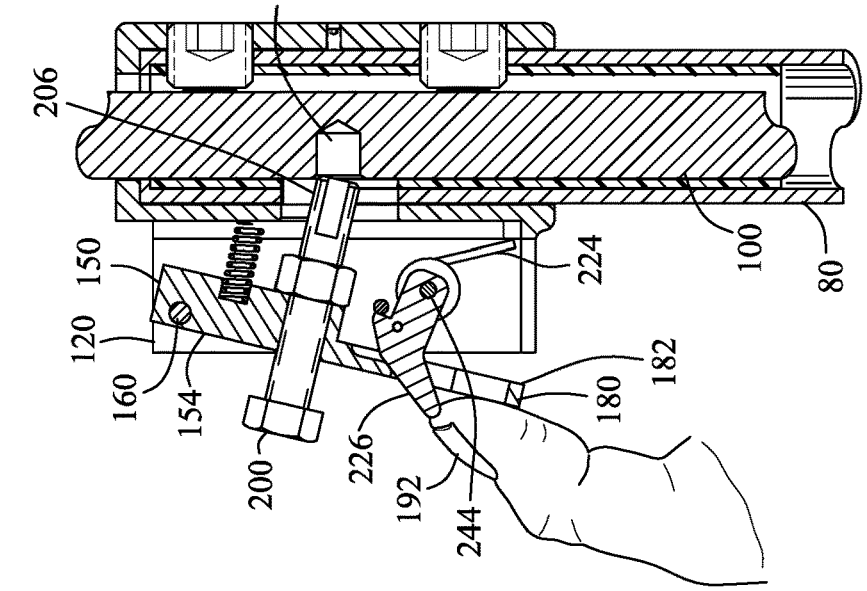
FIG. 21 is a view similar to FIG. 20 illustrating the finger continuing to apply a descending force for positioning a locking shoulder of the retainer over the platform for retaining the pin with the second pole.
Figure 22:
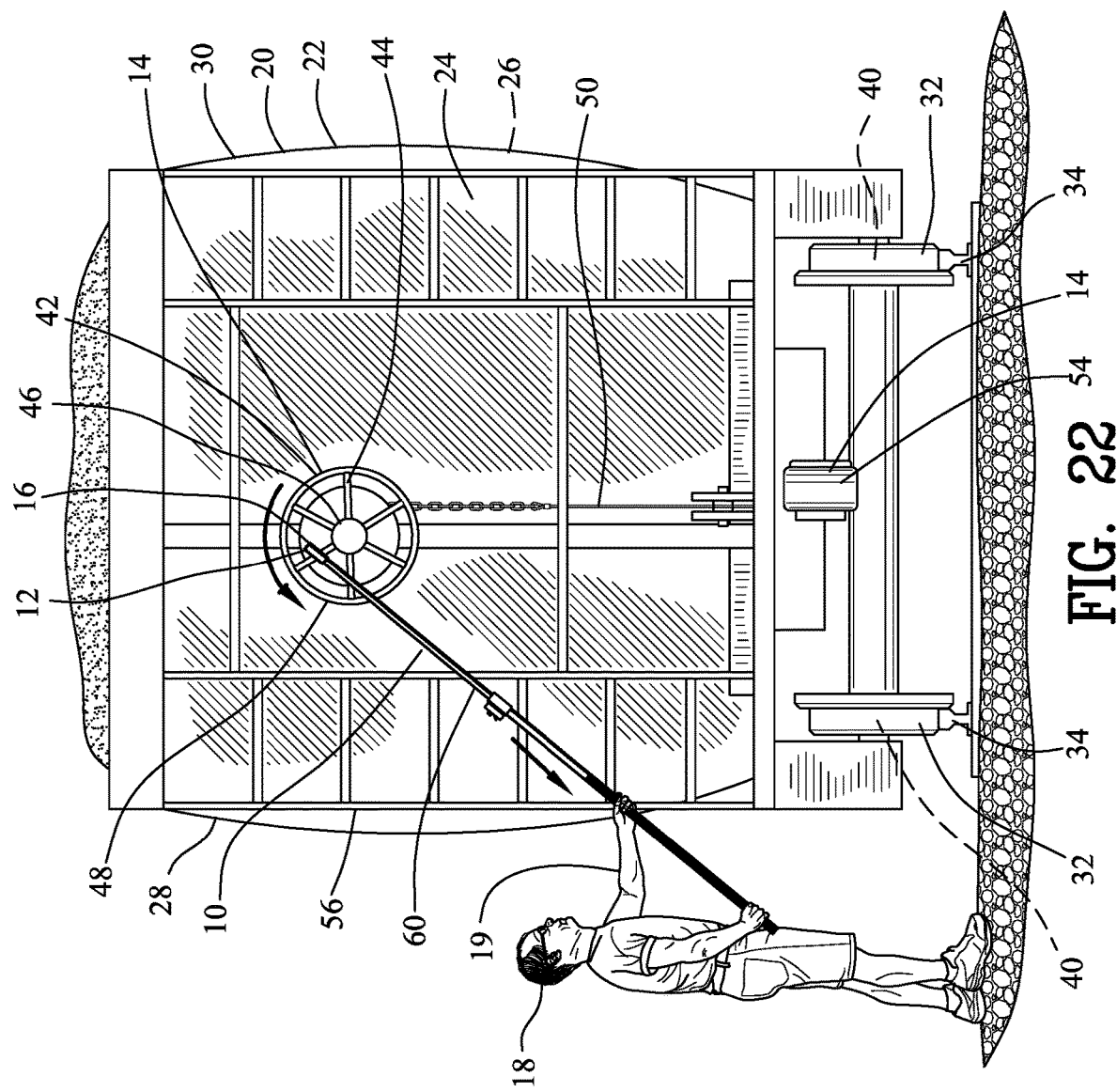
FIG. 22 is a view of the extension tool of FIG. 1 engaging a brake wheel of a railroad car.

As best shown in FIGS. 19-21, the platform 150 engages the retainer 180 adjacent to the platform notch 176 during positioning the platform 150 into the closed position 152 for defining a platform resistance portion 178. The platform fulcrum portion 170, the platform effort portion 174 and the platform resistance portion 178 define a platform lever 180 for obtaining a platform leverage 182 during positioning the platform 150 from the open position 154 to the closed position 152.

The platform effort arm 172 includes an upper arm surface 190 for receiving a descending force 192 and positioning the pin 200 into one of the plurality of apertures 112 of the second pole 100. The platform effort arm 172 further includes a lower arm surface 194 for receiving an ascending force 196 and withdrawing the pin 200 from one of the plurality of apertures 112 of the second pole 100.

A platform spring 198 may be positioned between the collar 120 and the platform 150 for providing a platform expanding force 199 and displacing the platform 150 from the closed position 152 to the open position 154 upon the retainer 220 disengaging from the platform 150. The platform lever 180 provides the platform leverage 182 for compressing the platform spring 198 during positioning the platform 150 from the open position 154 to the closed position 152. A spring bore in the platform 150 may frictionally engage with the platform spring 198 may couple the platform spring 198 with the platform 150.

The retainer 220 may be pivotably coupled to the collar 120. A retainer spring 224 may engage between the collar 120 and the retainer 220 for biasing the retainer 220 into engagement with the platform 150. The retainer 220 includes a retainer sloped surface 226 for slidably engaging with the platform 150 and pivoting the retainer 220 upon contact with the platform 150 with the descending force 222 for positioning the pin 200 within one of the plurality of apertures 112 in the second pole 100.

The retainer 220 may include a retainer effort arm 230 for receiving a force 232 to overcome the retainer spring 224 and displacing the retainer 220 from the platform 150 for permitting pivoting of the platform 150 from the closed position 152 to the open position 154.

The retainer 220 extends between a proximal end 240 and a distal end 242. A retainer pivot 244 engages the collar 120 and the retainer 220 for pivoting the retainer 220 relative to the collar 120. The retainer pivot 244 is preferably adjacent to the proximal end 240 of the retainer 220 for defining a retainer fulcrum portion 250. A retainer effort arm 230 is adjacent to the distal end 242 of the retainer 220 for defining a retainer effort portion 254. A retainer lock surface 256 is between the retainer pivot 244 and the retainer effort arm 230. The retainer lock surface 256 engages the platform 150 when the platform 150 is in the closed position 152 for defining a retainer resistance portion 258. The retainer fulcrum portion 250, the retainer effort portion 254 and the retainer resistance portion 258 define a retainer lever 260 for obtaining a retainer leverage 262 for overcoming the retainer spring 224 and pivoting the retainer 220 and disengaging the retainer 220 from the platform 150.

To vary the overall length of the extension tool 10, the retainer 220 is pivoted away from the platform 154 permitting the platform 152 pivot away from the collar 120. Upon pivoting the platform 150 the pin 200 is withdrawn from one of the plurality of apertures 112. Thereafter, the second pole 100 may be slidably displaced relative to the first pole 80.

The first pole 80 may further include an end cap 96 coupled to the first end 86 of the first pole 80. The end cap 96 assists in preventing the extension tool 10 from slipping through the hands of the operator 18.

The extension tool 10 may further include a first bushing 140 and a second bushing 142. The first bushing 140 is secured within the internal bore 82 of the first pole 80. The first bushing 140 is retained within the first pole 80 by the collar setscrew 126. The second bushing 142 is secured over the exterior surface 104 of the second pole 100. Preferably, the second bushing 142 is affixed to the exterior surface 104 of the second pole 100 by a suitable adhesive or a mechanical fastener or the like. As the second pole 100 slidably engages within the first pole 80, the second pole 100 slides within the first bushing 140 and the second bushing 142 slides against the internal bore 82 of the first pole 80. The first bushing 140 and the second bushing 142 reduce the friction between the first pole 80 and the second pole 100 during extension and retraction between the first pole 80 and the second pole 100. The first bushing 140 and the second bushing 142 also prevent jamming between the first pole 80 and the second pole 100 during extension and retraction between the first pole 80 and the second pole 100. Preferably, the first pole 80, the second pole 100 and the collar 120 are formed of a metallic material such as aluminum, steel or other metallic materials. Furthermore, the first bushing 140 and the second bushing 1142 may be formed of a polymeric material for creating a metallic to polymeric sliding engagement between the first pole 80 and the second pole 100.

Figure 8:
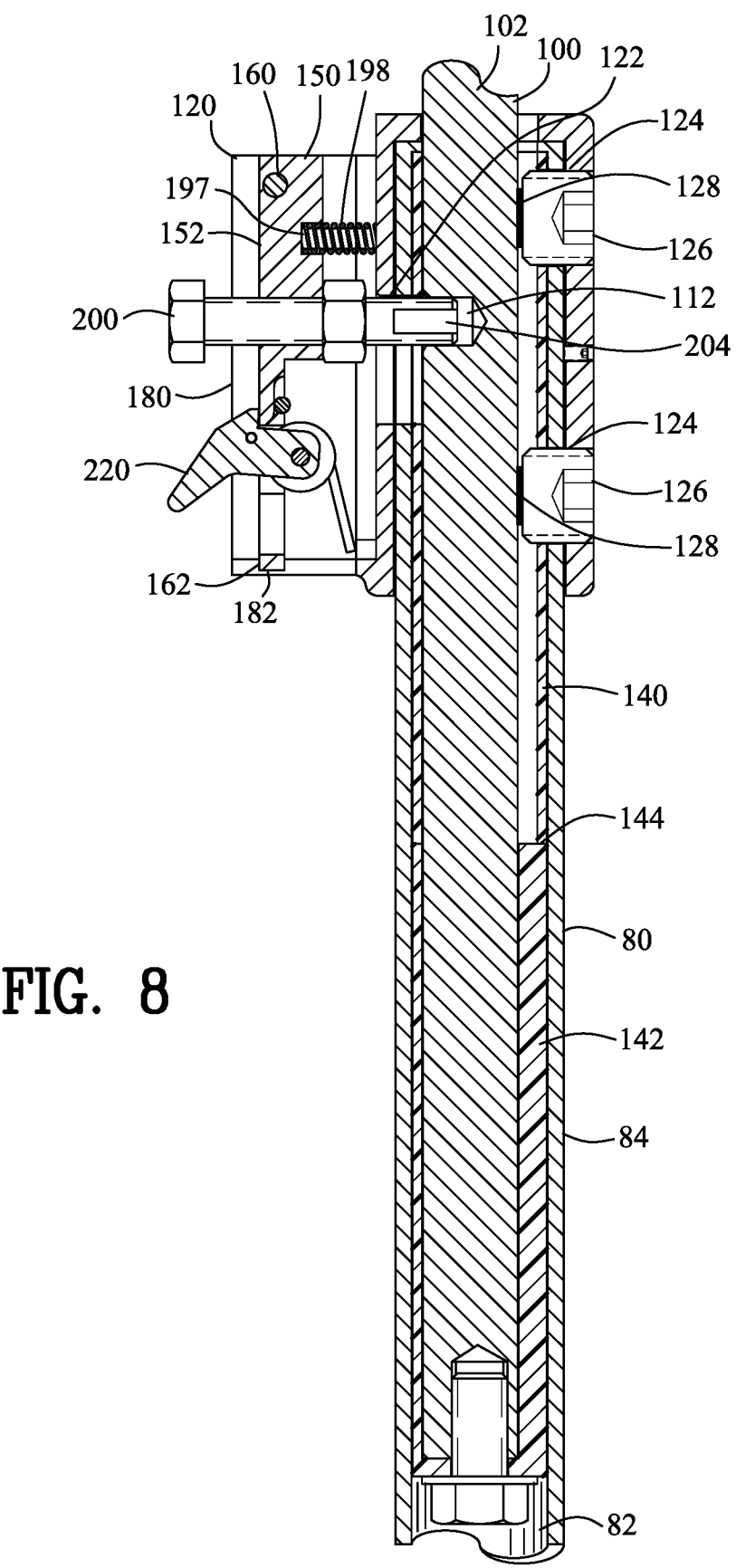
FIG. 8 is a view similar to FIG. 7 illustrating the second pole in a maximum extended position and a first bushing coupled within the first pole engaging with a second bushing coupled to the exterior of the second pole.
Figure 9:
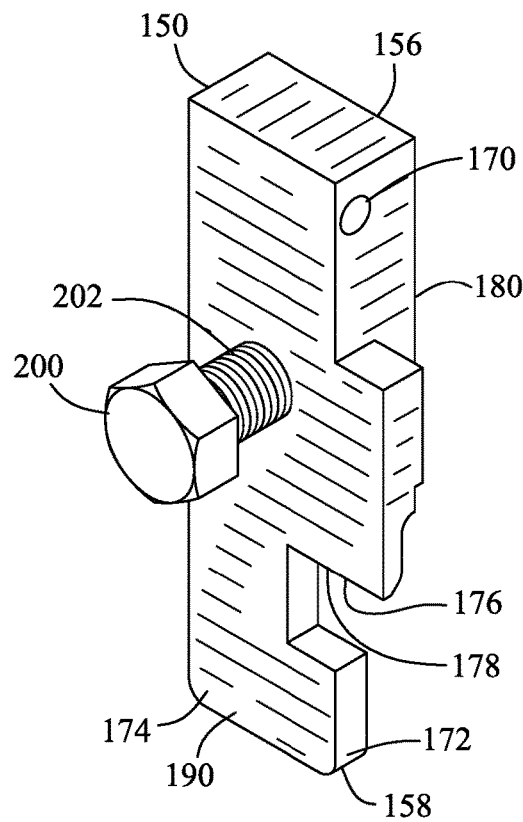
FIG. 9 is a top isometric view of a platform of FIG. 1.
Figure 10:
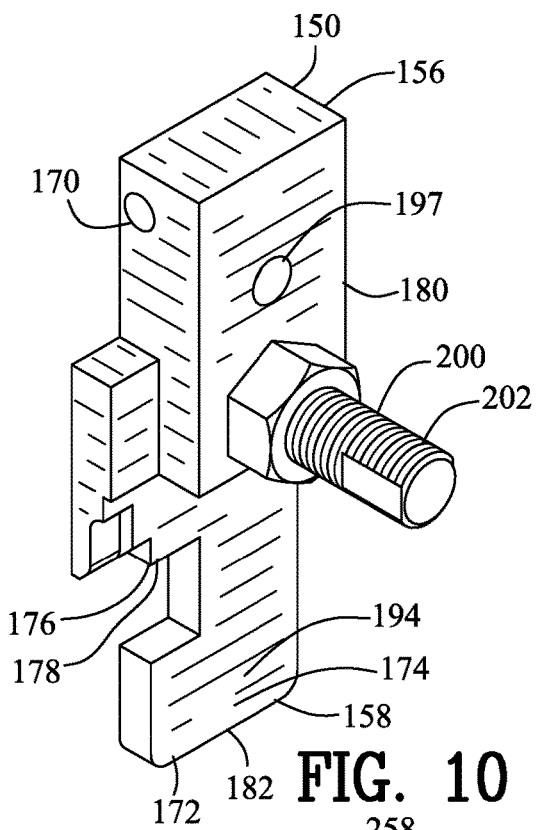
FIG. 10 is a rear isometric view of FIG. 8.
Figure 11:
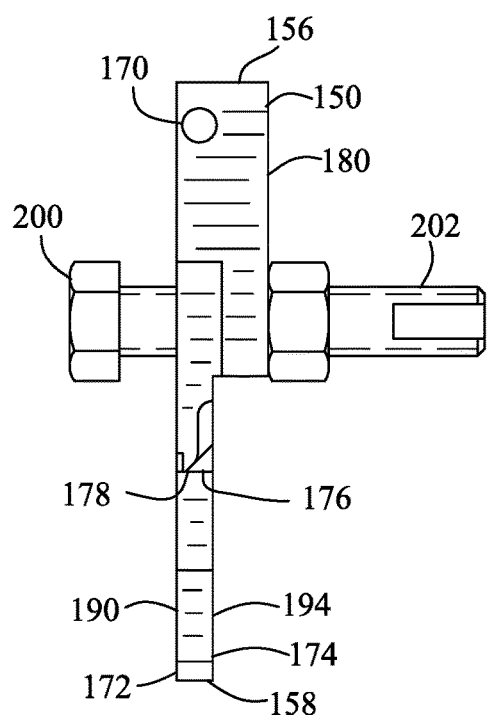
FIG. 11 is a left side view of FIG. 9.
Figure 12:
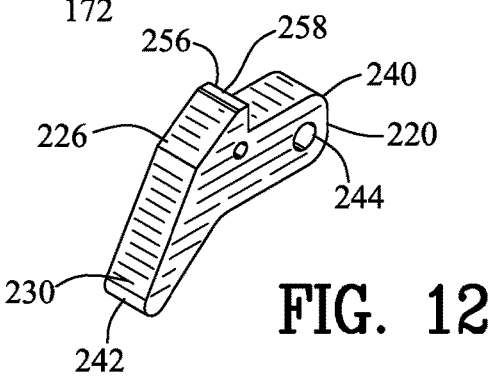
FIG. 12 is a top isometric view of a retainer of FIG. 1.
Figures 13, 14:
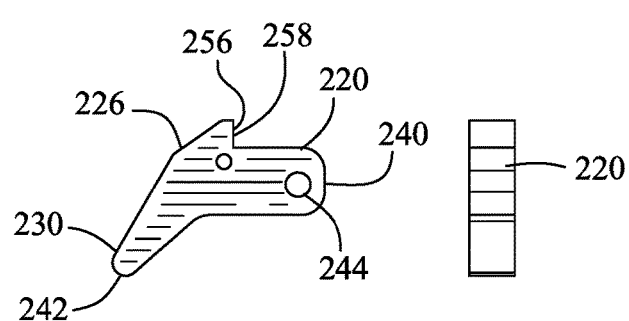
FIG. 13 is a right side view of FIG. 12.
FIG. 14 is a front view of FIG. 12.
Figure 15:
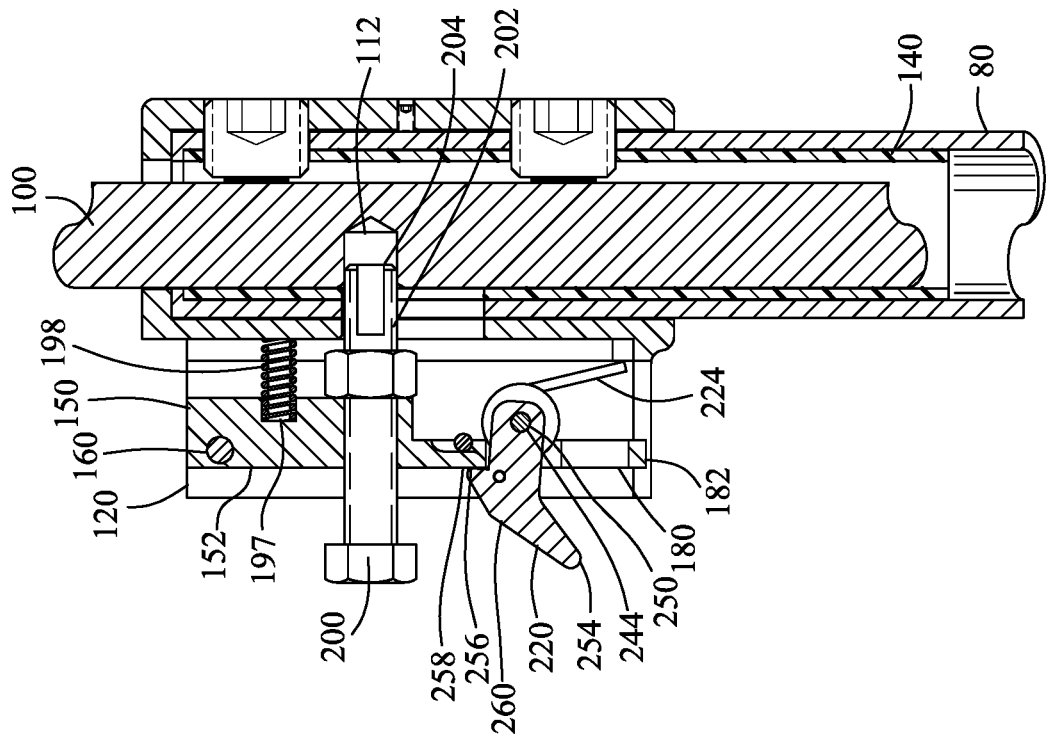
FIG. 15 is a view similar to FIG. 7 illustrating a pin having a first depth adjustment.
Figure 16:
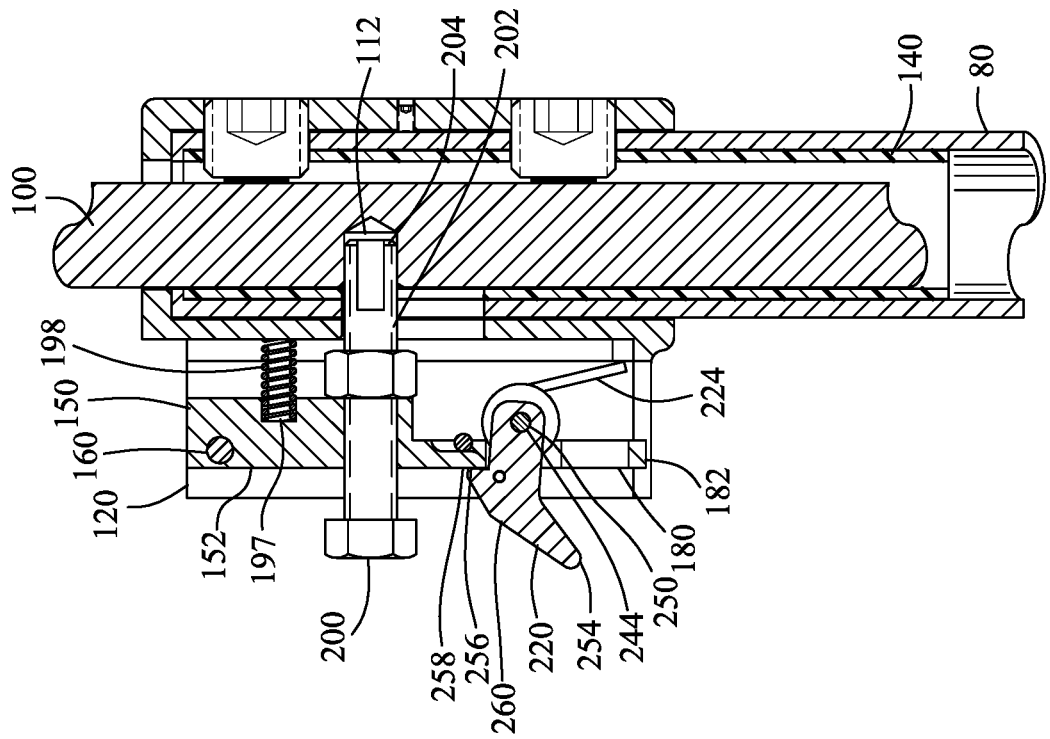
FIG. 16 is a view similar to FIG. 15 illustrating the pin have a second depth adjustment.
Figure 17:
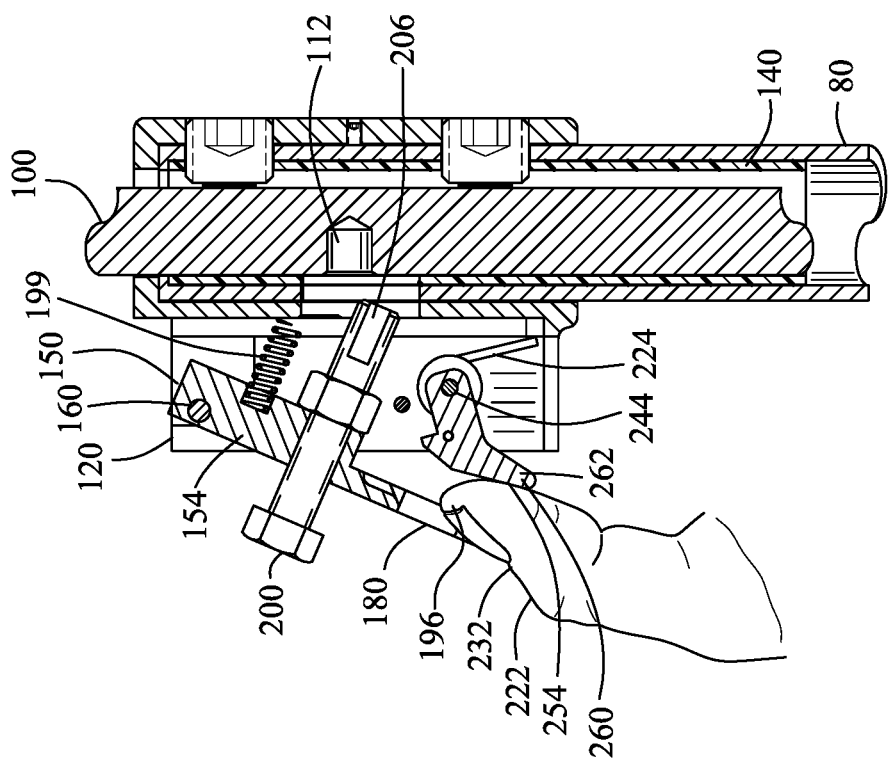
FIG. 17 is a view similar to FIG. 15 illustrating a thumb depressing the retainer and a finger engaging the platform.

As seen in FIG. 8, the first bushing 140 and second bushing 142 contact for defining an upper telescoping stop 144. The upper telescoping stop 144 terminates further extension of the second pole 100 from within the first pole 80.

Although the extension tool 10 has been shown with the specific applications or uses, it should be appreciated to those skilled in the art that the extension tool 10 may be used for countless other applications and uses. A small but not inclusive list of readily apparent applications and uses include window cleaning, tent poles, gaff hooks, mooring poles, drywall supports, outboard motor, trailer supports, remote positioning of objects, gas sensors, load lock for trucks, garden tools, towers for vessels and illumination stands.

In order to reduce friction between the elongated flat portion 114 and the collar setscrew 126, a lubricant sheet 128 is coupled to the collar setscrew 126. The lubricant sheet 128 may be constructed from a polytetrafluoroethylene material having a circular cross-section and secured to the collar setscrew 126 by an adhesive. The polytetrafluoroethylene material may have a thickness between 0.01 inches and 0.1 inches.

The extension tool 10 may be utilized in the maximum expended length for rotating a brake wheel 42 in the clockwise direction. The maximum expended length enables the individual to avoid positioning himself between the railroad cars 20 and thereby improving safety. The top edge of the claw or tool head 16 may be utilized for applying a force against the brake wheel 42 to cause a clockwise rotation. Alternatively, the extension tool 10 may be utilized for rotating a brake wheel 42 in the counter clockwise direction. The bottom edge of the claw or tool head 16 may be utilized for applying a force against the brake wheel 42 to cause a counter clockwise rotation. The extension tool 10 may further be utilized in the maximum expended length for pivoting a knuckle coupler 52 of a railroad car 20 by pulling or pushing the knuckle coupler 52. The maximum expended length enables the individual to avoid positioning himself between the railroad cars 20 and thereby improving safety.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An extension tool for extending a device, comprising:
    a first pole defining an interior bore and a first exterior surface with said first pole extending between a first end and a second end;
    a handle defined in proximity to said first end of said first pole;
    a second pole defining a second exterior surface with said second pole extending between a first end and a second end;
    a couple attaching the device with said second pole;
    said second pole partially disposed in said first pole with said internal bore of said first pole slidably engaging with said exterior surface of said second pole for enabling said second pole to be slidably displaced relative to said first pole;
    a plurality of apertures defined in said second pole;
    a collar secured to said second end of said first pole having a pin aperture;
    a platform pivotably coupled to said collar for pivoting said platform relative to said collar between a closed position and an open position;
    a pin coupled to said platform;
    a retainer pivotably coupled to said collar for engaging with said platform and maintaining said platform in said closed position and disengaging from said platform and positioning said platform in said open position;
    said closed position positioning said pin in a protruded position and said open position positioning said pin in a retracted position;
    said protruded position engaging said pin into one of said plurality of apertures of said second pole for fixing the position of said second pole relative to said first pole;
    said retracted position disengaging said pin from one of said plurality of apertures of said second pole for permitting displacement of said second pole relative to said first pole;
    said platform extends between a proximal end and a distal end;
    a platform pivot engaging said collar and said platform;
    said platform pivot adjacent to said proximal end of said platform for defining a platform fulcrum portion;
    a platform effort arm adjacent to said distal end of said platform for defining a platform effort portion;
    said platform engaging said retainer during positioning said platform into said closed position for defining a platform resistance portion; and said platform fulcrum portion, said platform effort portion and said platform resistance portion defining a platform lever for obtaining a platform leverage during positioning said platform from said open position to said closed position.

2. The extension tool as set forth in claim 1, wherein said collar includes a first wall and a second wall for defining a wall channel; and said platform pivotably coupled to said first wall and said second wall for positioning said platform within said wall channel in said closed position and exterior to said wall channel in said open position.

3. The extension tool as set forth in claim 2, wherein said platform defining a channel cover over said wall channel with said platform in said closed position.

4. The extension tool as set forth in claim 1, wherein said platform effort arm includes an upper arm surface for receiving a descending force and positioning said pin into one of said plurality of apertures of said second pole; and said platform effort arm includes a lower arm surface for receiving an ascending force and withdrawing said pin from one of said plurality of apertures of said second pole.

5. The extension tool as set forth in claim 1, further including a platform spring positioned between said collar and said platform for providing a platform expanding force and displacing said platform from said closed position to said open position upon said retainer disengaging from said platform; and said platform lever providing said platform leverage for compressing said platform spring during positioning said platform from said open position to said closed position.

6. The extension tool as set forth in claim 1, further including a threaded pin depth adjustment coupled to said pin and adjusting the depth of engagement of said pin with said plurality of apertures in said second pole.

7. The extension tool as set forth in claim 1, wherein said retainer is pivotably coupled to said collar; and a retainer spring engaging between said collar and said retainer for biasing said retainer into engagement with said platform.

8. The extension tool as set forth in claim 7, wherein said retainer includes a retainer sloped surface for slidably engaging with said platform and pivoting the retainer upon contact with the platform with said descending force for positioning the pin with the second pole.

9. The extension tool as set forth in claim 7, wherein said retainer includes a retainer effort arm for receiving a force to overcome said retainer spring and displacing said retainer from said platform for permitting pivoting of said platform from said closed position to said open position.

10. The extension tool as set forth in claim 7, wherein said retainer extends between a proximal end and a distal end;

a retainer pivot engaging said collar and said retainer;
said retainer pivot adjacent to said proximal end of said retainer for defining a retainer fulcrum portion;
a retainer effort arm adjacent to said distal end of said retainer for defining a retainer effort portion;
a retainer lock surface between said retainer pivot and said retainer effort arm;
said retainer lock surface engaging said platform with said platform in said closed position for defining a retainer resistance portion; and
said retainer fulcrum portion, said retainer effort portion and said retainer resistance portion defining a retainer lever for obtaining a retainer leverage for overcoming said retainer spring and pivoting said retainer and disengaging said retainer from said platform.

11. An extension tool for extending a device, comprising:
a first pole defining an interior bore and a first exterior surface with said first pole extending between a first end and a second end;
a handle defined in proximity to said first end of said first pole;
a second pole defining a second exterior surface with said second pole extending between a first end and a second end;
a couple attaching the device with said second pole;
said second pole partially disposed in said first pole with said internal bore of said first pole slidably engaging with said exterior surface of said second pole for enabling said second pole to be slidably displaced relative to said first pole;
a plurality of apertures defined in said second pole;
a collar secured to said second end of said first pole having a pin aperture;
a platform pivotably coupled to said collar for pivoting said platform relative to said collar between a closed position and an open position;
a pin coupled to said platform;
a retainer pivotably coupled to said collar for engaging with said platform and maintaining said platform in said closed position and disengaging from said platform and positioning said platform in said open position;
said closed position positioning said pin in a protruded position and said open position positioning said pin in a retracted position;
said protruded position engaging said pin into one of said plurality of apertures of said second pole for fixing the position of said second pole relative to said first pole;
said retracted position disengaging said pin from one of said plurality of apertures of said second pole for permitting displacement of said second pole relative to said first pole;
said platform extends between a proximal end and a distal end;
a platform pivot engaging said collar and said platform;
said platform pivot adjacent to said proximal end of said platform for defining a platform fulcrum portion;
a platform effort arm adjacent to said distal end of said platform for defining a platform effort portion;
a platform notch between said platform pivot and said platform effort arm for permitting the retainer to traverse said platform;
said platform notch engaging said retainer during positioning said platform into said closed position for defining a platform resistance portion;
said platform fulcrum portion, said platform effort portion and said platform resistance portion defining a platform lever for obtaining a platform leverage during positioning said platform from said open position to said closed position;
a retainer pivot engaging said collar with said retainer;
a retainer spring engaging between said collar and said retainer for biasing said retainer into engagement with said platform;
said retainer extends between a proximal end and a distal end;
a retainer pivot engaging said collar and said retainer;
said retainer pivot adjacent to said proximal end of said retainer for defining a retainer fulcrum portion;

a retainer effort arm adjacent to said distal end of said retainer for defining a retainer effort portion;
a retainer lock surface between said retainer pivot and said retainer effort arm;
said retainer lock surface engaging said platform with said platform in said closed position for defining a retainer resistance portion; and
said retainer fulcrum portion, said retainer effort portion and said retainer resistance portion defining a retainer lever for obtaining a retainer leverage for overcoming said retainer spring and pivoting said retainer and disengaging said retainer from said platform.

12. An extension tool for engaging a railroad car, the railroad car including a front side, a rear side, a left side and a right side, the front side and the rear side including a knuckle coupler for linking with a second railroad car, the front side and the rear side also including a wheel brake for engaging a railroad brake, the extension tool, comprising:
a first pole defining an interior bore and a first exterior surface with said first pole extending between a first end and a second end;
a handle defined in proximity to said first end of said first pole;
a second pole defining a second exterior surface with said second pole extending between a first end and a second end;
said second pole partially disposed in said first pole with said internal bore of said first pole slidably engaging with said exterior surface of said second pole for enabling said second pole to be slidably displaced relative to said first pole;
a plurality of apertures defined in said second pole;
a collar secured to said second end of said first pole having a pin aperture;
a platform pivotably coupled to said collar for pivoting said platform relative to said collar between a closed position and an open position;
a pin coupled to said platform;
a retainer pivotably coupled to said collar for engaging with said platform and maintaining said platform in said closed position and disengaging from said platform and positioning said platform in said open position;
said closed position positioning said pin in a protruded position and said open position positioning said pin in a retracted position;
said protruded position engaging said pin into one of said plurality of apertures of said second pole for fixing the position of said second pole relative to said first pole;
said retracted position disengaging said pin from one of said plurality of apertures of said second pole for permitting displacement of said second pole relative to said first pole;
a claw securing to said second end of said second pole for engaging either the knuckle coupler or the wheel brake of the railroad car;
said platform extends between a proximal end and a distal end;
a platform pivot engaging said collar and said platform;
said platform pivot adjacent to said proximal end of said platform for defining a platform fulcrum portion;
a platform effort arm adjacent to said distal end of said platform for defining a platform effort portion; and
said platform fulcrum portion and said platform effort portion defining a platform lever for positioning said platform from said open position to said closed position.

13. An extension tool for extending a device, comprising:
a first pole defining an interior bore and a first exterior surface with said first pole extending between a first end and a second end;
a handle defined in proximity to said first end of said first pole;
a second pole defining a second exterior surface with said second pole extending between a first end and a second end;
a couple attaching the device with said second pole;
said second pole partially disposed in said first pole with said internal bore of said first pole slidably engaging with said exterior surface of said second pole for enabling said second pole to be slidably displaced relative to said first pole;
a plurality of apertures defined in said second pole;
a collar secured to said second end of said first pole having a pin aperture;
a platform pivotably coupled to said collar for pivoting said platform relative to said collar between a closed position and an open position;
a pin coupled to said platform;
a retainer coupled to said collar and engaging with said platform for maintaining said platform in said closed position and disengaging with said platform for positioning said platform in said open position;
said closed position positioning said pin in a protruded position and said open position positioning said pin in a retracted position;
said protruded position engaging said pin into one of said plurality of apertures of said second pole for fixing the position of said second pole relative to said first pole;
said retracted position disengaging said pin from one of said plurality of apertures of said second pole for permitting displacement of said second pole relative to said first pole;
said retainer is pivotably coupled to said collar;
a retainer spring engaging between said collar and said retainer for biasing said retainer into engagement with said platform; and
said retainer includes a retainer sloped surface for slidably engaging with said platform and pivoting the retainer upon contact with the platform with said descending force for positioning the pin with the second pole.

14. An extension tool for extending a device, comprising:
a first pole defining an interior bore and a first exterior surface with said first pole extending between a first end and a second end;
a handle defined in proximity to said first end of said first pole;
a second pole defining a second exterior surface with said second pole extending between a first end and a second end;
a couple attaching the device with said second pole;
said second pole partially disposed in said first pole with said internal bore of said first pole slidably engaging with said exterior surface of said second pole for enabling said second pole to be slidably displaced relative to said first pole;
a plurality of apertures defined in said second pole;
a collar secured to said second end of said first pole having a pin aperture;

a platform pivotably coupled to said collar for pivoting said platform relative to said collar between a closed position and an open position;

a pin coupled to said platform;

a retainer coupled to said collar and engaging with said platform for maintaining said platform in said closed position and disengaging with said platform for positioning said platform in said open position;

said closed position positioning said pin in a protruded position and said open position positioning said pin in a retracted position;

said protruded position engaging said pin into one of said plurality of apertures of said second pole for fixing the position of said second pole relative to said first pole;

said retracted position disengaging said pin from one of said plurality of apertures of said second pole for permitting displacement of said second pole relative to said first pole;

said retainer is pivotably coupled to said collar;

a retainer spring engaging between said collar and said retainer for biasing said retainer into engagement with said platform; and said retainer includes a retainer effort arm for receiving a force to overcome said retainer spring and displacing said retainer from said platform for permitting pivoting of said platform from said closed position to said open position.

15. An extension tool for extending a device, comprising:

a first pole defining an interior bore and a first exterior surface with said first pole extending between a first end and a second end;

a handle defined in proximity to said first end of said first pole;

a second pole defining a second exterior surface with said second pole extending between a first end and a second end;

a couple attaching the device with said second pole;

said second pole partially disposed in said first pole with said internal bore of said first pole slidably engaging with said exterior surface of said second pole for enabling said second pole to be slidably displaced relative to said first pole;

a plurality of apertures defined in said second pole;

a collar secured to said second end of said first pole having a pin aperture;

a platform pivotably coupled to said collar for pivoting said platform relative to said collar between a closed position and an open position;

a pin coupled to said platform;

a retainer coupled to said collar and engaging with said platform for maintaining said platform in said closed position and disengaging with said platform for positioning said platform in said open position;

said closed position positioning said pin in a protruded position and said open position positioning said pin in a retracted position;

said protruded position engaging said pin into one of said plurality of apertures of said second pole for fixing the position of said second pole relative to said first pole;

said retracted position disengaging said pin from one of said plurality of apertures of said second pole for permitting displacement of said second pole relative to said first pole;

said retainer is pivotably coupled to said collar;

a retainer spring engaging between said collar and said retainer for biasing said retainer into engagement with said platform;

said retainer extends between a proximal end and a distal end;

a retainer pivot engaging said collar and said retainer;

said retainer pivot adjacent to said proximal end of said retainer for defining a retainer fulcrum portion;

a retainer effort arm adjacent to said distal end of said retainer for defining a retainer effort portion;

a retainer lock surface between said retainer pivot and said retainer effort arm;

said retainer lock surface engaging said platform with said platform in said closed position for defining a retainer resistance portion; and said retainer fulcrum portion, said retainer effort portion and said retainer resistance portion defining a retainer lever for obtaining a retainer leverage for overcoming said retainer spring and pivoting said retainer and disengaging said retainer from said platform.

* * * * *